United States Patent [19]

Perlman

[11] Patent Number: 5,462,881
[45] Date of Patent: Oct. 31, 1995

[54] TEMPORARY LIQUID STORAGE CAVITIES IN A CENTRIFUGE TUBE

[75] Inventor: Daniel Perlman, Arlington, Mass.

[73] Assignee: Brandeis University, Waltham, Mass.

[21] Appl. No.: 219,840

[22] Filed: Mar. 30, 1994

Related U.S. Application Data

[63] Continuation-in-part of Ser. No. 215,132, Mar. 18, 1994, abandoned, which is a continuation-in-part of Ser. No. 110,313, Aug. 23, 1993, abandoned.

[51] Int. Cl.⁶ .................................................. G01N 1/10
[52] U.S. Cl. .......................... 436/180; 422/72; 422/100; 422/102; 435/283.1
[58] Field of Search .......................... 422/72, 100, 102, 422/101, 104; 435/296, 299–301; 436/180

[56] References Cited

U.S. PATENT DOCUMENTS

| | | |
|---|---|---|
| 3,976,579 | 8/1976 | Bennett .................................. 422/72 X |
| 4,279,863 | 7/1981 | Friehler .................................. 422/102 |
| 4,469,793 | 9/1984 | Guigan .................................. 422/72 X |
| 4,469,793 | 9/1984 | Guigan .................................. 422/72 X |
| 4,942,017 | 7/1990 | Turpen .................................. 422/102 X |
| 4,942,017 | 7/1990 | Turpen .................................. 422/102 X |
| 4,980,293 | 12/1990 | Jeffs .................................. 422/102 X |
| 4,980,293 | 12/1990 | Jeffs .................................. 422/102 X |
| 5,073,341 | 12/1991 | Hargreaves .......................... 422/102 X |
| 5,202,093 | 4/1993 | Cloyd .................................. 422/102 |

Primary Examiner—James C. Housel
Assistant Examiner—Harold Y. Pyon
Attorney, Agent, or Firm—Thorpe, North & Western

[57] ABSTRACT

Centrifuge tube, specimen well, covering lid and method of their use, the well having an inner wall between an upper opening and a bottom region, including between the upper opening and the bottom region a liquid-holding cavity having a liquid drain channel, the lid having a bottom wall including alternative liquid-holding cavities. The liquid-holding cavities are configured and arranged to allow liquid in these cavities to flow to the bottom region only when a centrifugal force is applied to the centrifuge tube.

9 Claims, 2 Drawing Sheets

TEMPORARY LIQUID STORAGE CAVITIES IN A CENTRIFUGE TUBE

RELATED APPLICATION

This application is a continuation-in-part of Perlman, filed Mar. 18, 1994, entitled "Temporary Liquid Storage Cavities In A Centrifuge Tube" and having a U.S. Ser. No. 08/215,132, which is a continuation-in-part of Perlman, filed Aug. 23, 1993, entitled "Specimen Well With Cavity Regulating Flow-Restrictive Channel" and having a U.S. Ser. No. 08/110,313.

1. Field of the Invention

This invention relates to dispensing and combining of liquid reagents in a centrifuge tube. More particularly, the invention concerns reagent mixing wells in microcentrifuge tubes, multiwell test plates and the like, in which a small volume of liquid reagent(s) in such a tube is temporarily held in a cavity, i.e., in an inner wall pocket of the tube or in compartments on the bottom wall of the lid covering such a centrifuge tube.

2. Background of the Invention

Jeffs, U.S. Pat. No. 4,980,293, describes a method to control the delivery of a reagent to the bottom of a specimen well. It states that the laboratory worker has relied solely on surface tension to hold a small droplet of reagent on the vertical or nearly vertical wall of a centrifuge tube or microtiter test plate well prior to the point in time when mixing of the reagent with other constituents in the tube or well (collectively termed a specimen well) was desired. Jeffs describes a method in which adhesion of a non-wetting liquid reagent to a non-vertical ledge surface within the well can be used to temporarily immobilize the reagent. Subsequently the reagent is displaced to the bottom of the well at a desired point in time and mixed with other reagents in the well by centrifugation.

SUMMARY OF THE INVENTION

According to the present invention, a new apparatus and method have been devised to provide temporary but physically secure storage of both large and small droplets of a reagent above the bottom of a centrifuge tube. The invention overcomes certain limitations of the droplet ledge described by Jeffs. It employs a cavity located on the inner wall surface of the specimen well of the centrifuge tube, alternatively, or at least two cavities on the underside of the lid covering such a well. On the inner wall surface of the centrifuge tube the liquid-holding area is generally in the form of a cavity configured and arranged to retain a liquid regardless of whether the cavity surface is wettable or non-wettable with regard to the liquid. The cavity, viewed from the side, is generally upwardly sloping toward the inside of the centrifuge tube to create a liquid-holding pocket, and viewed from the front, may be U or V-shaped, e.g., cup-shaped to funnel liquid toward its center. Extending downwardly from the lowest point of the cavity, a capillary tube, narrow slot or other flow-restrictive drain channel provides a means of initially preventing flow and subsequently allowing flow and transport of all liquid placed in the cavity. Flow occurs only when an external force is exerted upon the liquid, generally through physical acceleration motion of the centrifuge tube. Thus, centrifugation of the centrifuge tube can be used to drive the liquid downward through the drainage channel. Depending upon the chemical composition and surface tension of the liquid droplet, and the wettable or non-wettable nature of the internal surface of the drainage channel, the channel may or may not fill with liquid when the droplet is deposited in the cavity. In any case, actual flow of liquid through and beyond the capillary-like channel or groove (down to the bottom region of the specimen well) does not occur until the centrifugal force is applied.

In brief, a pocket-shaped cavity in a centrifuge tube is drained by a flow-restrictive channel which functions as a gate to allow passage of liquid after, and only after, an appropriate centrifugal force has been exerted on the reagent. The force includes at least a component of force directed parallel to the principal axis, and generally toward the bottom of the centrifuge tube. Appropriate contouring of the cavity and positioning of the drain assures that the entire volume of a reagent droplet deposited in the cavity will be drained and delivered to the bottom region of the centrifuge tube at the proper point in time. This droplet delivery is assured regardless of how the tube is rotated about its principal axis as it is placed into the centrifuge rotor. While liquid drainage in Jeffs depends upon liquid flowing over the inner edge of the ledge, the present invention has a central conduit drain which penetrates and connects to the liquid-holding cavity and functions whether the cavity is oriented toward the outside or the inside of a typical fixed angle centrifuge rotor.

Alternatively, liquid-holding compartments may be placed in the cap or lid covering the centrifuge tube rather than in the well of the centrifuge tube itself. In this case, the location and design of the compartments and the mechanism of liquid drainage are different from those of the liquid support means on the wall of the specimen well in Jeffs. In their simplest form, the lid compartments, viewed when the lid is closed, consist of small open chambers or cavities (open bottoms for drainage) which are incorporated into the underside, i.e., added to the bottom wall of the lid. When the lid is closed, liquid is initially retained within the cavities or compartments, just as liquid is held in an inverted honeycomb structure or in an upright pipet held closed at the top with one's finger. When centrifugation is applied generally downward on the tube and lid, all of the liquid is forced from the compartments to the bottom of the centrifuge tube. If two or more liquids are placed in multiple compartments in the lid (and/or in multiple centrifuge tubes) and the tubes are then simultaneously centrifuged, the liquids become synchronously mixed. When the lid is closed, the walls of each lid compartment are typically perpendicular to the top of the lid, and therefore parallel to the axis of the centrifuge tube. Thus, following centrifugation, there is no possible retention of liquid in the compartments. This is in contrast to the specimen well ledge in Jeffs, in which the upper surface of the ledge sometimes undesirably retains a portion of the liquid following centrifugation. Several other advantages are realized by placing the liquid-holding pockets on the underside of the lid rather than in the specimen well itself. First, regardless of whether the lid is of the hinged or screw cap type, its underside is readily accessible and more convenient than a specimen well ledge for depositing liquid from a dispensing device. Second, if one wishes to deposit aliquots of a second liquid on a series of ledges in a specimen well which already contain a first liquid, it is probable that the tip of an entering dispensing device will become contaminated with traces of the first liquid (and carry that liquid to other specimen wells). However, in the present invention, as the depositing site for the dispensed liquid, the use of lid compartments (which are physically separated from the centrifuge tube) prevents such contamination. Third, by placing the liquid-holding compartments in the lid and not modifying the inside well surface of the centrifuge tube, all of the original utility of the well portion of the tube is conserved. For example, during vortex-mixing of liquids, some of the liquid may become immobilized on any ledge placed on the wall of the specimen well. Fourth, many frictionally sealing hinged caps and screw caps include an annular portion extending downward into the specimen well from the underside of the lid (serving to frictionally seal the specimen well or to restrict movement of an O-ring seal), and such an annulus can be used as an outer protective perimeter wall into which the liquid-holding compartments can be constructed. Even in microcentrifuge tubes holding only 1.5 milliliters of liquid, the lid annulus generally occupies a volume of 100–200 microliters which provides ample space for multiple liquid-holding compartments. For example, into such a round lid annulus, Applicant has formed four quarter-round, sectored compartments each measuring approximately 0.12 inch on an edge, 0.15 inch deep, and holding in excess of twenty microliters of liquid. These sectored compartments formed in an injection-molded polypropylene hinged lid of a 1.7 ml capacity microcentrifuge tube retain their full capacity of aqueous liquids (with the lid closed) until centrifugal force is applied to the tube.

By providing temporary storage of droplets above the bottom of a centrifuge tube, the present invention is intended to solve two commonly encountered problems in the laboratory associated with adding liquid reagents to such tubes. First, synchronous or timed addition of one or more reagents to an enzymatic reaction in a single tube (or to parallel reactions in multiple tubes), is often required with biochemical testing. Microcentrifuge tubes are small injection-molded thermoplastic tubes having conical bottoms and are designed for holding small volumes of liquids (typically less than 2 milliliters) during centrifugation and during other procedures including, for example, chemical and enzymatic reactions. The second problem involves verifying and tracking the addition of microliter quantities of reagents to a series of specimen wells. For example, when adding between approximately 0.1 microliter and 100 microliters of a reagent to a series of tubes which are already holding a volume of liquid, e.g., 0.2–1.0 milliliters, it is easy to lose track of which tubes have already received the reagent and which have not. The use of visible cavities in the lid or on the sidewall of the tube for depositing one or more droplets of reagent allows visual assurance and verification that a given reagent has been added to a given centrifuge tube.

By fabricating the liquid-holding means of the present invention in the form of open compartments in the lid or shallow pockets with a raised edge facing the inside of the centrifuge tube, several additional problems encountered are solved. Typically, liquid droplets are deposited in centrifuge tubes using a micropipet tip. Lid compartments and sidewall pockets of the present invention provide a positive arrest point for the tip during delivery of the droplets so that premature addition of a reagent to other reaction components in the specimen well does not occur. Furthermore, the lid compartments or the raised edge of the tube pockets allow a substantial volume of liquid to be deposited without running down the wall of the well. Wetting as well as non-wetting liquids can be placed in these cavities. Also, as stated above, some of the cavities of the present invention are provided with a flow-restrictive drainage channel (i.e., a channel which does not drain the cavity without application of a force in addition to natural gravity). By connecting this drainage channel to the lowest point in the cavity, liquid cannot become trapped in the cavity.

Thus, in a first aspect, the invention features a method of transferring at least one liquid component placed in a centrifuge tube, from a location above the bottom region of the tube, down to the bottom region of the same tube where a combining of ingredients occurs. The liquid transfer method involves providing a centrifuge tube with a specimen well whose inner perimeter wall includes at least one pocket. The pocket includes at least one cavity or liquid-holding cavity or area with a flow-restrictive, downwardly extending liquid drain channel. The liquid-holding cavity is positioned above the bottom region of the tube. Next, at least one droplet of at least one liquid component is deposited in the cavity for temporary storage. Liquid flow or other displacement of the liquid component through and beyond the drain channel under the force of natural gravity is prevented by the channel. Finally a centrifugal force is applied to cause the transfer of at least one liquid component from the cavity, through the transfer channel to the bottom region of the centrifuge tube at a predetermined point in time.

As a variation of the above method, a centrifuge tube is provided with a frictionally sealing hinged lid or a screw cap lid whose underside, i.e., bottom wall, includes two or more liquid-holding cavities or compartments. Next, with the lid open, at least one droplet of at least one liquid component is deposited in at least one compartment for temporary storage, and the lid is closed or reattached to the tube. Liquid flow or other displacement of each droplet from a compartment under the force of natural gravity is prevented by negative pressure and/or surface tension between the liquid and the inside surface of the compartment. Finally a centrifugal force is applied to cause the transfer of at least one liquid component from the compartment, to the bottom region of the centrifuge tube at a predetermined point in time.

As another variation of the above method, prior to applying the centrifugal force to cause transfer of a liquid component, the method may also include placing at least one chemical substance directly into the bottom region of the centrifuge tube such that this chemical substance receives and combines with the liquid component held above the bottom region in the above-described pocket or lid compartment when the centrifugal force is applied.

As a further variation of the above method, at least one droplet of each of two or more liquid components may be deposited in separate cavities before applying the above-described force to cause liquid transfer.

In a second aspect, the invention features a centrifuge tube with a specimen well having an inner wall between an upper opening and a bottom region, including between the upper opening and the bottom region a liquid-holding cavity or area having a liquid drain channel. The cavity is able to hold a volume of liquid and is configured and arranged to allow the liquid to flow only to the drain channel when the centrifuge tube is upright. The drain channel is configured and arranged to allow liquid in the cavity to flow through the liquid drain channel to the bottom region of the centrifuge tube only when a gravitational force greater than natural gravity is applied to the centrifuge tube.

As a variation of the above aspect, the invention features a centrifuge tube with a specimen well having a frictionally sealing hinged cap or a screw cap type lid. The underside, i.e., bottom wall of the lid includes two or more cavities or compartments, each of which is configured and arranged to hold at least one droplet of liquid by negative pressure and/or surface tension between the liquid and the inside surface of the compartment. Each compartment is also configured and arranged to allow liquid in the compartment to flow to the bottom region of the centrifuge tube only when a gravitational force greater than natural gravity is applied to the centrifuge tube.

In preferred embodiments, the modified centrifuge tube or modified lid is a structural feature in any one of a number of laboratory containers including the microcentrifuge tube, test tube, cell culture tube, multi-well test plate, cryogenic vial, blood specimen tube, clinical diagnostic tube, and chemical assay tube.

Liquid components and chemical substances used with the present invention may include organic and inorganic chemicals, biological substances (e.g., clinical samples such as sputum, blood and urine), biochemical substances (e.g., DNA, RNA, proteins) and combinations thereof. The liquid holding cavities described herein are configured and arranged to hold these liquids.

In other preferred embodiments, the pocket has a raised inner edge to increase the volume capacity of the cavity for holding a liquid component. Furthermore, the pocket includes a cup-shaped area to additionally increase its liquid-holding capacity. When viewed from the front, the liquid-holding area of the pocket, and in particular the cavity is preferably U or V-shaped. The pocket may either protrude from, or be recessed into the inner wall of the centrifuge tube. To optimize the efficiency of liquid transfer to the bottom region of the centrifuge tube, the liquid drain channel is preferably connected to the lowest point of the liquid-holding area in the cavity. The downwardly extending liquid drain channel is preferably fabricated in the form of an open grooved channel, or a capillary, i.e., tube-like channel. To provide additional resistance or a barrier against premature or spontaneous flow of liquid through the channel under the force of natural gravity, the inside surface of this drainage channel may be fabricated of non-wettable material or may be rendered non-wettable. Generally, the drainage channel is oriented vertically or with a substantial vertical component to direct the liquid downward in the centrifuge tube. The channel may be in the form of a narrow capillary channel. In this case, the channel may be wettable with respect to the liquid component, since surface tension and viscosity of a liquid in the filled capillary prevents premature flow under the force of natural gravity.

In still other preferred embodiments, liquid-holding cavities or compartments are located on the underside of the lid of the centrifuge tube. Each cavity may be partially or completely recessed in the bottom wall of the lid or may protrude from the bottom wall of the lid in the form of a compartment with raised walls. A cavity or compartment is typically cup-shaped, cylindrical, or in the form of a sector of a circle. With the latter form, a cylindrical compartment on the underside of the lid is generally divided into several sectors, e.g., 2–4, to provide temporary storage space for multiple liquid reagents such as enzymes, substrates, tracer labelling solutions, and the like. Applicant has empirically determined that with such lid compartments molded from a polyolefin thermoplastic such as polyethylene or polypropylene, it is possible to form compartments which can easily retain aqueous liquid volumes of as much as 50–100 microliters without any premature flow or displacement of the liquid from the compartment under the force of natural gravity.

Another application for the well pocket or lid compartment of the present invention is to provide visual confirmation, and thus procedural assurance, that at least one droplet of a particular liquid component has been introduced, or is about to be introduced into each and every sample in a series of centrifuge tubes. For example, as noted above, when adding microliter volume droplets of a liquid to a series of microcentrifuge tubes already holding liquid, it is not uncommon to lose track of which tube has or has not received a droplet. Adding the series of droplets via the visible pocket eliminates this problem.

The ability to synchronously combine liquid components and/or reagents is another important feature of the present invention. This can be brought about within a single centrifuge tube when multiple liquid components, initially in multiple liquid-holding cavities, are simultaneously combined in the bottom region of the well. Alternatively, a synchronous combining of components may be desirable among multiple centrifuge tubes when carrying out a series of parallel reactions whose products are to be compared with one another, e.g., DNA sequencing reactions, limited enzymatic digestion reactions, etc. In each of these cases, single or multiple centrifuge tubes may be simultaneously exposed to centrifugal force to cause transfer and mixing of the liquids in the bottom region of the sample wells.

Thus, the invention features a centrifuge tube for combining and mixing ingredients. The centrifuge tube includes at least one liquid-holding cavity. A cavity on the inner wall of the specimen well of the tube has a downwardly extending flow-restrictive drain channel. Alternatively, liquid-holding cavities are formed on the underside, i.e., the bottom, of the lid of the container. Each liquid-holding cavity is configured and arranged to hold at least one droplet, and is positioned above the bottom region of the centrifuge tube, so that when a force in addition to natural gravity is applied to the droplet, it is transferred to the bottom region of the centrifuge tube at a predetermined point in time.

Other features and advantages of the invention will be apparent from the following description of the preferred embodiments thereof, and from the claims.

DESCRIPTION OF THE PREFERRED EMBODIMENTS

The drawings will first be briefly described.

Structure

Figure 1:
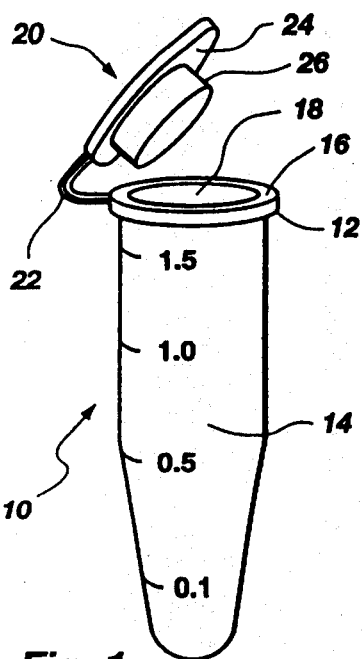
FIG. 1 is a perspective view of an open microcentrifuge tube container of this invention comprising a container, lid and centrifuge tube having four pockets with flow-restrictive channels (not shown).
Figures 2A, 2B:
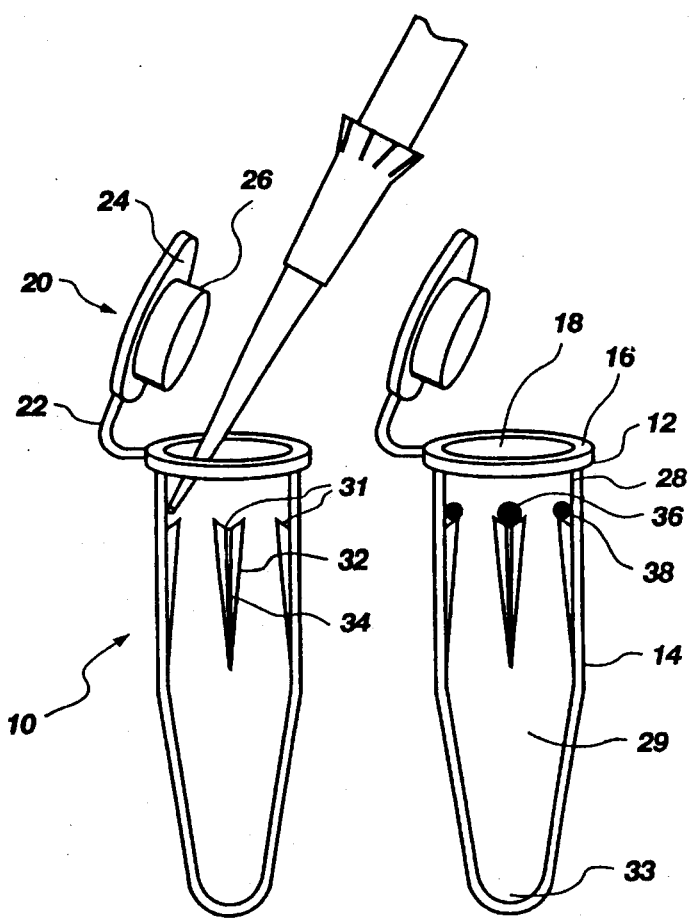
FIGS. 2A and 2B are generally longitudinal side sectional views of the container, lid and centrifuge tube of FIG. 1, shown before (FIG. 2A) and after (FIG. 2B) depositing three droplets in three liquid-holding pockets (using a micropipet tip as shown).
Figure 3:
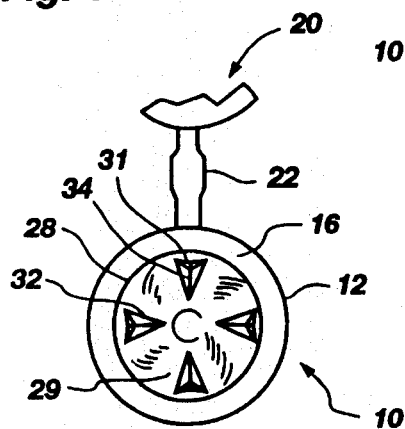
FIG. 3 is a partial plan view of the top of the container of FIGS. 1 and 2 showing the tube and multiple pockets with flow-restrictive channels.
Figure 4:
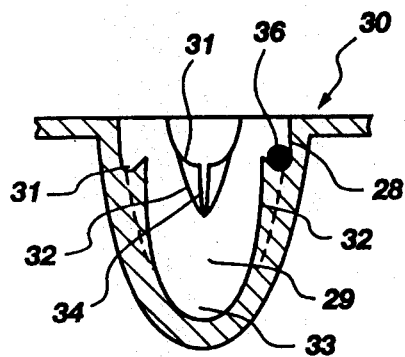
FIG. 4 is a longitudinal sectional view of one well in a microtiter plate or tray (having multiple wells), each well having multiple pockets with flow-restrictive channels.

Referring to FIGS. 1, 2, 3 and 6, microcentrifuge tube 10 (approximately 1.5 inches long and 0.44 inches in diameter) is typically injection molded from virgin polypropylene or polyethylene and has a lip flange 12 which is used to support the tube in a microcentrifuge rotor or in a storage rack. Generally the microcentrifuge tube is formed with a container 14 having an upper perimeter wall surface 16 (defining an upper opening 18) adapted to mate with lid 20 (see FIGS. 1 and 2). Lid 20 is attached to container 14 by lid hinge 22, and may be lifted upward and moved above container 14 using lid lifting tab 24. Typically a fingernail or container opening tool is used to exert upward force on lid lifting tab 24. Lid 20 also includes an annular lid seal 26 (located on the underside of the lid 20) which provides and establishes a watertight hermetic (or aseptic) friction seal with the inner perimeter wall surface, i.e., inner wall 28 of the specimen well 29 of container 14.

Figure 5:
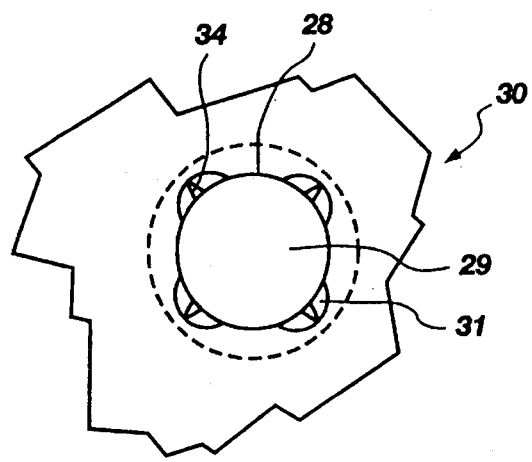
FIG. 5 is a partial plan view of the top of the microtiter plate well shown in FIG. 4.

Referring to FIGS. 1 through 5 (FIG. 5 illustrating one specimen well 29 in microtiter plate 30), a means is provided for temporarily storing at least one liquid component within a container 14 and specimen well 29 by placing it into liquid-holding cavity 31 of pocket 32 located on inner perimeter wall surface 28 above a bottom region 33 of specimen well 29 (for later transfer to bottom region 33). For the purpose of this transfer, cavity 31 is fitted with, and connected to a flow-restrictive channel 34 which serves as a drain. Large and small droplets 36 and 38 respectively of one or more liquid components may be placed for subsequent transfer and/or combining with other components and chemical substances in bottom region 33 of specimen well 29.

In these figures, pocket 32 is drawn as a structure added to, i.e., protruding from the inner perimeter wall surface 28 of the centrifuge tube 29. However, pocket 32 can be equally effective, for the purposes of the present invention, as a recessed liquid-holding shelf or pocket notched into the inner perimeter wall surface 28 of the specimen well (FIG. 5). Such a recessed pocket would have a flow-restrictive drain channel 34 functioning in the same manner as that described for the protruding ledge 32. As shown clearly in FIGS. 2A, 2B and 4–5, the tube 10 defines the specimen well 29, and the ledge 32 is formed on the inner wall surface 28 of the tube 10 but does not extend around the upper opening 18 so as to define the liquid-holding cavity 31. When viewed from the front (FIG. 2), the cavity 31 is typically V-shaped and, when viewed from the side (FIG. 2 and FIG. 5), is sloped downward at an angle toward the inner perimeter wall surface 28 of specimen well 29, to funnel all liquid in cavity 31 downward through drain channel 34. Drain channel 34 is typically narrow, e.g., 0.5 mm width or less, is vertically connected to cavity 31, and may be in any desired shape, e.g., an open groove or slit (as shown) or a closed tube or capillary. As shown clearly in FIGS. 2A, 2B and 4–5, the open-groove channel 34 is formed on the inner wall surface 28 of the tube 10 and extends downward from the liquid-holding cavity 31 toward the bottom region 33 of the tube.

Figure 6:
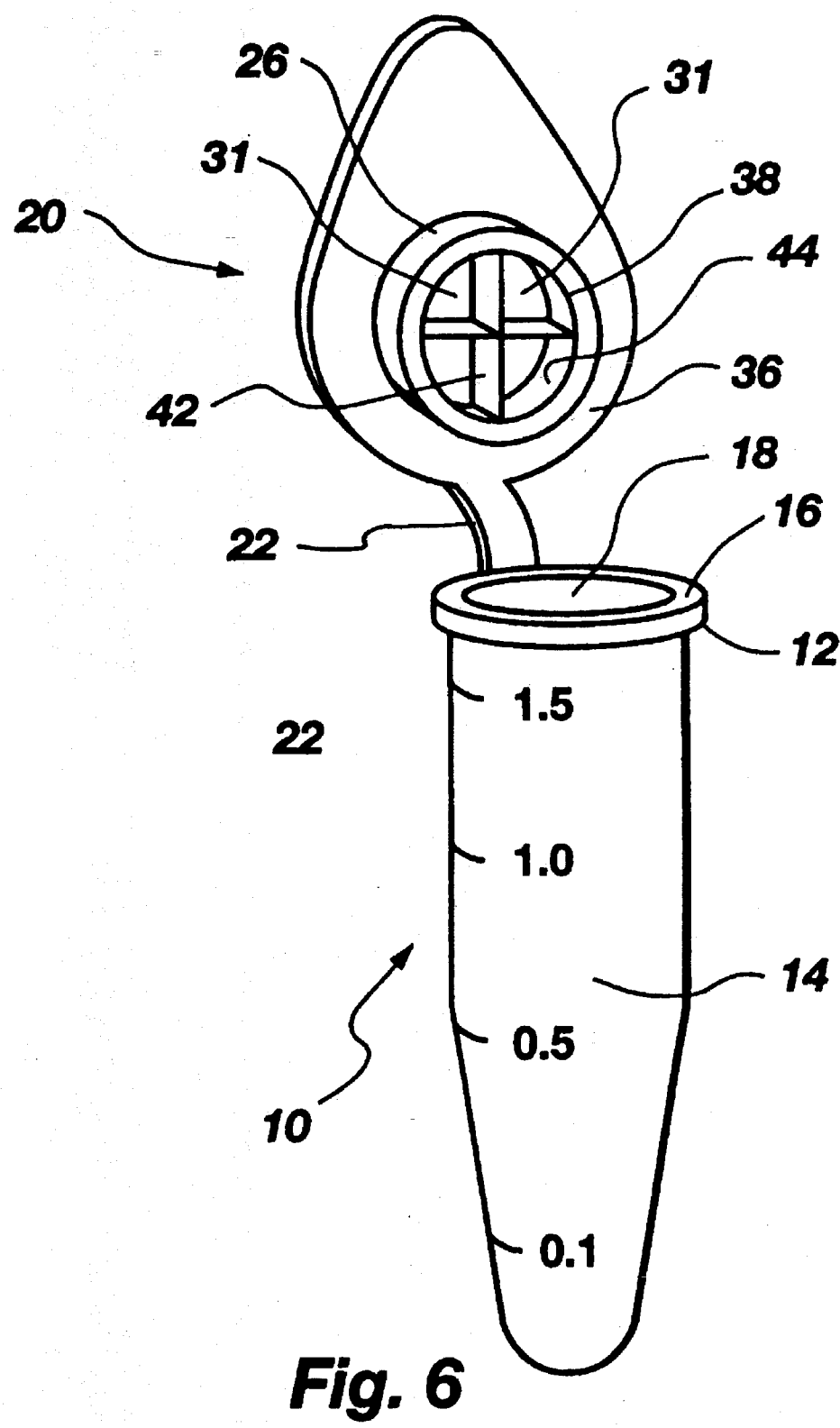
FIG. 6 is a perspective view of an open microcentrifuge tube container, specimen well, and lid having four sectored compartments for liquids, placed within the perimeter of the annular lid seal.

Referring to FIG. 6, a means is provided for temporarily storing at least two liquid components within a microcentrifuge tube 10 which includes container 14 having lid 20 which is attached to the container 14 by a lid hinge 22. Container 14 is formed with an upper perimeter wall surface 16 (defining an upper opening 18) adapted to mate with lid 20. This means of storing liquid (also used with other lid structures such as screw cap lids) involves providing at least two liquid-holding cavities 31 formed on, or in the underside, i.e., the bottom wall surface 36 of lid 20. Each cavity 31 is defined by an outer perimeter edge 38 generally representing the outer limit and maximum volume for a liquid component stored in the cavity 31. In the case of hinged lid 20 which includes an annular lid seal 26, it is convenient to fabricate multiple liquid-holding cavities 31 in the form of sectored walled compartments within this annular structure. The geometry of such liquid-holding cavities may vary from lid to lid depending upon the structure of a particular lid. In FIG. 6, four such walled cavities or compartments 31, formed using either injection-molded polypropylene or polyethylene thermoplastic resin, are shown. To avoid altering the elasticity and sealing properties of the annular lid seal 26, the radial walls 42 do not abut or otherwise contact this lid seal 26, but rather abut a concentric inner ring wall 44 to form closed-walled sectored compartments. Each cavity 31 holds approximately 25 microliters of liquid, while container 14 holds approximately 1.5 milliliters of liquid.

During use, a liquid droplet or droplets are placed on top of each desired centrifuge tubepocket or in each lid compartment. Other liquid or solid materials are placed at the bottom of the well as needed. Precise mixing of the materials at a desired point in time can be achieved by centrifugation of the tube either by hand or in a centrifuge.

Tubes of this invention can be fabricated using standard methodology.

Other embodiments are within the following claims.

I claim:

1. A method of controlling delivery of at least one liquid component to a bottom region of a centrifuge tube, said method comprising the steps of:

(a) providing a centrifuge tube comprising:
      at least one specimen well defined by an inner perimeter wall and having an upper opening and an opposing bottom region;
      at least one ledge formed on said inner wall but not extending around the upper opening so as to define a liquid-holding cavity;
      an open-groove liquid drain channel formed on the inner wall and extending downward from the liquid-holding cavity toward the bottom region of the specimen well;

(b) depositing a volume of a liquid component in said liquid-holding cavity for temporary storage of said liquid component, such that no liquid flow of said liquid component from said liquid-holding cavity or beyond said open-groove drain channel occurs under the force of natural gravity; and (c) applying a centrifugal force to said centrifuge tube to cause flow of said liquid component from said liquid-holding cavity through said drain channel and into said bottom region of said centrifuge tube.

2. The method of claim 1, wherein prior to step (c), said method further includes the step of placing a chemical substance directly into the bottom region of said centrifuge tube such that said chemical substance contacts said liquid component when said centrifugal force is applied.

3. The method of claim 1, wherein step (a) further comprises providing such a centrifuge tube having a plurality of ledge surfaces and corresponding liquid-holding cavities, and step (b) comprises depositing a volume of each of two or more liquid components in said liquid-holding cavities.

4. A centrifuge tube comprising:
   a tube having an inner wall defining a specimen well between an upper opening and an opposing bottom region;

at least one ledge formed on the inner wall of the tube but not extending around the upper opening so as to define a liquid-holding cavity;

an open-groove liquid drain channel formed on the inner wall and extending downward from the liquid-holding cavity toward the bottom region of the tube;

wherein said cavity is able to hold a volume of liquid, said cavity and open-groove channel being configured and arranged to allow said liquid to flow through said open-groove channel to said bottom region when centrifugal force is applied to said tube.

5. The centrifuge tube of claim 4, wherein said liquid-holding cavity is further defined by a raised edge of the ledge to thereby increase the liquid-holding capacity of said cavity.

6. The centrifuge tube of claim 4, wherein said open-groove drain channel is connected to a lowest point of said liquid-holding cavity.

7. The centrifuge tube of claim 4, wherein said open channel is non-wettable.

8. The centrifuge tube of claim 4, wherein said open-groove drain channel is generally vertical.

9. The centrifuge tube of claim 4, wherein said liquid-holding cavity is recessed into the inner wall of said centrifuge tube.

* * * * *